United States Patent
Marantz

(10) Patent No.: US 7,190,565 B1
(45) Date of Patent: Mar. 13, 2007

(54) CAPACITOR HAVING REDUCED NON-CAPACITIVE IMPEDANCE

(75) Inventor: Yakov Marantz, Brooklyn, NY (US)

(73) Assignee: Johanson Manufacturing Corporation, Boonton, NJ (US)

( * ) Notice: Subject to any disclaimer, the term of this patent is extended or adjusted under 35 U.S.C. 154(b) by 127 days.

(21) Appl. No.: 11/118,459

(22) Filed: Apr. 28, 2005

(51) Int. Cl.
*H01G 7/00* (2006.01)

(52) U.S. Cl. ............... 361/277; 361/287; 361/290; 361/299.4; 361/292

(58) Field of Classification Search ............ 361/299.4, 361/298.2, 298.4, 298.5, 272–277, 278, 287–290, 361/292, 296–297
See application file for complete search history.

(56) References Cited

U.S. PATENT DOCUMENTS

| | | | |
|---|---|---|---|
| 2,504,758 A | 4/1950 | Thias et al. | |
| 2,670,453 A | 2/1954 | Leuthold et al. | |
| 3,034,027 A | 5/1962 | Swick | |
| 4,101,951 A * | 7/1978 | Kuze | 361/293 |
| 4,179,722 A * | 12/1979 | Johanson | 361/293 |
| 4,389,696 A | 6/1983 | Azuchi | |
| 4,389,762 A | 6/1983 | Reeves | |
| 4,550,361 A * | 10/1985 | Swinehart | 361/295 |
| 5,867,360 A * | 2/1999 | Kishishita et al. | 361/292 |
| 6,498,712 B1 * | 12/2002 | Ditlya | 361/277 |
| 6,690,568 B2 * | 2/2004 | Johnson | 361/277 |

* cited by examiner

*Primary Examiner*—Nguyen T. Ha
(74) *Attorney, Agent, or Firm*—Morgan & Finnegan, LLP

(57) ABSTRACT

An adjustable capacitor has a tubular housing including a first insulating section and a second section having a conductive portion at the exterior surface thereof forming an external terminal. An external terminal conductor is joined to an exterior terminal portion of the capacitor housing, for connecting the terminal to an external circuit. The external terminal conductor has a thickness, over its length, not less than a thickness of the housing. The external terminal conductor can have a width greater than the width of the housing, and a thickness not appreciably less than the average thickness of the housing. The external terminal conductor can be press-fitted onto the housing to form a secure electrical connection, attached by another suitable means, or integrally formed therewith.

20 Claims, 7 Drawing Sheets

CAPACITOR HAVING REDUCED NON-CAPACITIVE IMPEDANCE

FIELD OF THE INVENTION

The present invention relates to a capacitor having an improved merit value, Q, and reduced power loss. Particularly, the present invention is directed to a trimmer-type variable capacitor having an external terminal connection, configured to reduce the non-capacitive parameters of the capacitor at high frequencies, and thereby reduce the capacitor's power loss.

BACKGROUND

A variety of capacitors are known for providing adjustable capacitance in electronic circuits. Conventional trimmable capacitors include a stationary conductor electrode, or stator, and a positionally adjustable conductor electrode separated from the stationary electrode by a dielectric, e.g., air. The capacitance is adjusted, or "trimmed," by moving the adjustable electrode closer to or further from the stationary electrode. Often such capacitors are mounted on printed circuit boards by soldering the external terminal connections of the capacitor to conductive elements on the printed circuit board.

All capacitors are imperfect to some degree. That is, parasitic impedance is associated with the capacitor elements, particularly the conductive terminal leads. A particular problem that occurs at high power levels and ultra high frequencies approaching 1 GHz and beyond is increased power losses. The skin effect caused by the conductor through which current is flowing can exaggerate both the capacitor reactance and overall capacitor performance at high power levels and high frequencies. Thus capacitors demonstrating low power loss at low and moderate frequencies and power, may become increasingly lossy due to conductor losses as frequency and power rise significantly.

One well-known trimmer capacitor is of the so-called barrel type, to which the instant invention applies. In that capacitor, shown in FIGS. 1 and 2, the movable electrode is situated inside a tubular housing or casing, generally cylindrical in form. Both electrode terminals are stationary and located on the capacitor casing. One of the electrodes, the stator, is located at one end of an insulating section of the casing and is ordinarily for most applications directly soldered to a printed circuit board terminal. The internal circumferential surface of a conductive casing section is threaded to receive a threaded adjustable electrode that can be screwed toward and away from the stationary end electrode for "trimming," or "tuning," the capacitance value. The conductive section of the casing forms the other electrode terminal and is in intimate electrical contact with the movable electrode.

With the barrel-type configuration, the end stator electrode can be connected directly to the circuit in which it is used. For the other electrode, however, it is necessary to provide an external conductor to connect the terminal at the side of the casing to the circuit. It has been found, however, that at highly elevated frequencies, e.g., >1 GHz, the capacitor Q value is diminished to an undesirable degree, and this is due at least in part to the added non-capacitive impedance of the external terminal connection under those conditions. The challenge has been to find an efficient and economic solution to this problem in order to provide trimmer capacitor for use at frequencies in the range of 1–10 GHz and beyond, especially during relatively high power handling.

BRIEF SUMMARY OF THE INVENTION

The present invention is an improvement over the existing trimmable capacitors of the type described above in that the geometry of the external terminal conductor is, in relation to the capacitor's external terminal geometry, configured to minimize the non-capacitive impedance that it inevitably introduces.

In the preferred embodiment, the external conductor is securely joined to the capacitor terminal and has a thickness that is not less than the average thickness of the capacitor terminal to which it is joined. This dimension of the conductor is desirably maintained undiminished throughout its entire length. Preferably, at the region of attachment to the capacitor terminal, the conductor surrounds, or at least has a width greater than the transverse dimension of the capacitor terminal on the capacitor housing. This width is also desirably continued throughout the conductor's length. To further improve the power transfer and reduce losses at the junction between the capacitor terminal and the conductor, the thickness of the wall of the conductive housing section of the capacitor, along the region of attachment to the external conductor, may be made greater than that of the remaining conductive housing section. The capacitor may advantageously be incorporated into alternating current electrical circuits operating at frequencies well above 1 GHz, in the range of 5 GHz to 10 GHz or more with reduced power losses due fundamentally to the improved external terminal connection of the invention.

For a more complete understanding of the invention and the nature and extent of its advantages, reference may be made to the accompanying drawings.

DETAILED DESCRIPTION OF THE PREFERRED EMBODIMENT

Figure 1:
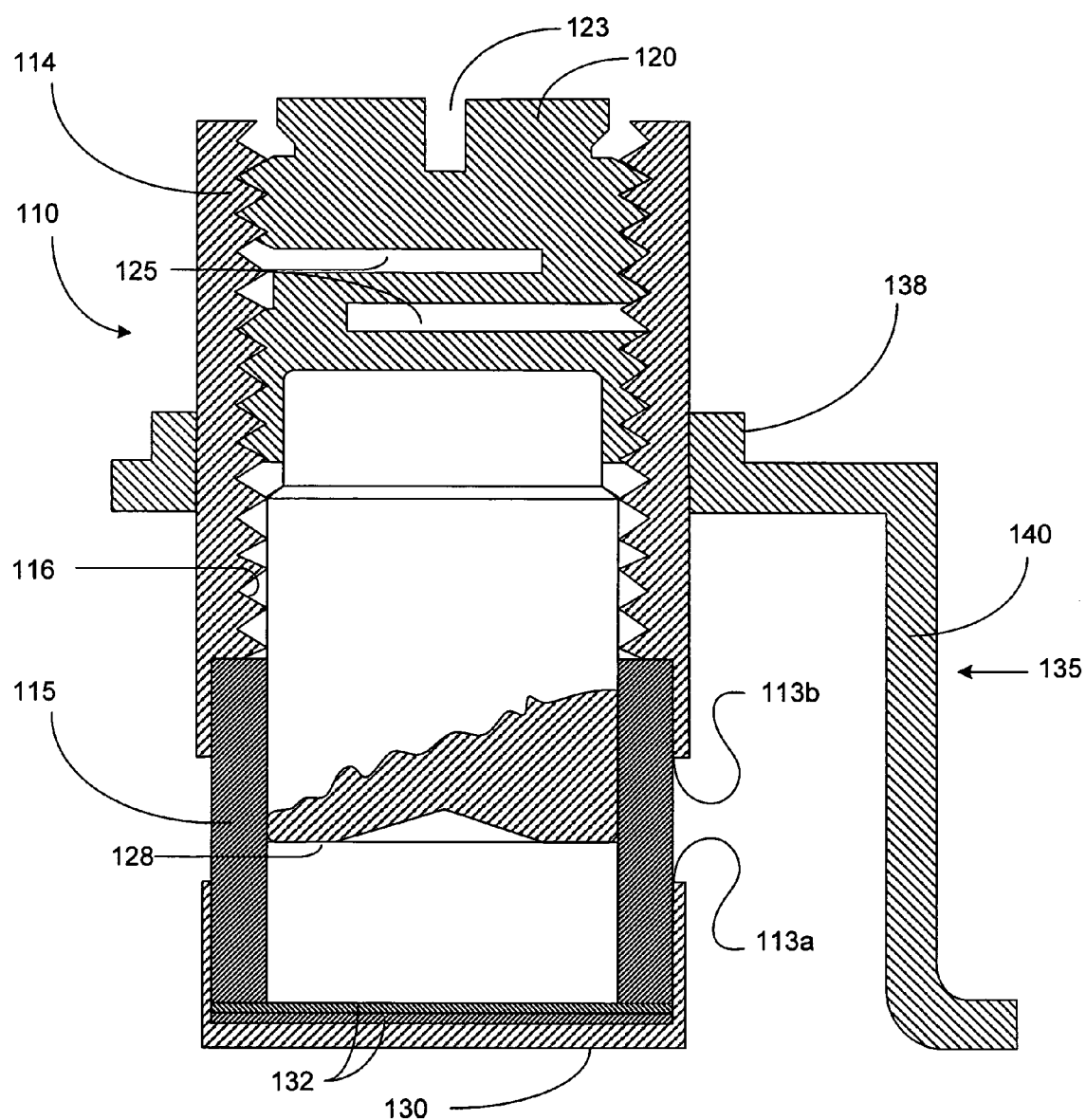
FIG. 1 is a cross-sectional side view of the prior art trimmable capacitor of the barrel type, previously described.
Figure 2:
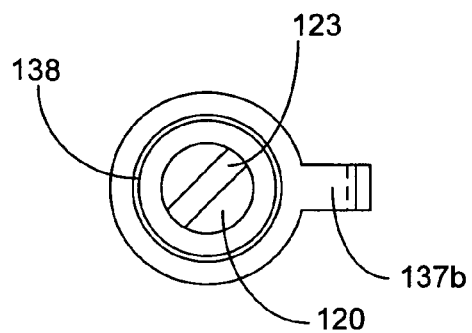
FIG. 2 is a plan view of the capacitor of FIG. 1.

Referring first to the prior art capacitor structure of FIGS. 1 and 2, the capacitor includes a tubular, or barrel-shaped, housing body 110 in three sections. The tubular housing body 110 is substantially cylindrical in form. The first housing section 130 acts as the stator electrode and is arranged at the lower end of the capacitor housing body 110. The first housing section 130 facilitates connection to a circuit board or other circuit connection. The second section 115 is formed of a suitable insulating dielectric material and is joined to the upper end of the first section 130 by an overlapping joint 113a. The third housing portion 114 is joined by another overlapping joint 133b to the upper end of the second section 115.

The third housing section 114 is threaded at its internal circumferential surface. The threads 116 mate with the threaded exterior surface of a movable rotor 120, which has a screwdriver slot 123 at its top and transverse slots 125 cut into the rotor from opposite sides. The slots cause the pitch of the threads at the top section of the rotor to be very slightly offset axially from the remaining threads, which causes the rotor 120 to frictionally engage the housing threads 116 to create a low electrical resistance interface and to prevent the rotor 120 from moving once adjusted. Of course, the rotor 120 can be adjusted by using a screwdriver or similar tool to turn the rotor 120 and thereby alter the axial position of the rotor in the housing.

It will be understood that the rotor 120 constitutes one electrode of the trimmable capacitor. The other electrode is constituted of the fixed, metallic stator electrode 130 at the lower end of the housing in FIG. 1. This electrode is commonly connected directly to a printed circuit terminal by solder. Interspersed between the end of the dielectric housing section 115 and the stator 130 are a pair of dielectric discs 132 formed of a material such as mica or sapphire. These discs 132 define the minimum extent of separation between the rotor end 128 and the stator 130 when the rotor is advanced to its minimum capacitance position. As is well understood, the distance between the rotor end 128 and stator 130 determines the adjusted value of the capacitance with the capacitive dielectric medium constituted of both the dielectric discs 130 and airspace between the rotor and stator.

Figure 3:
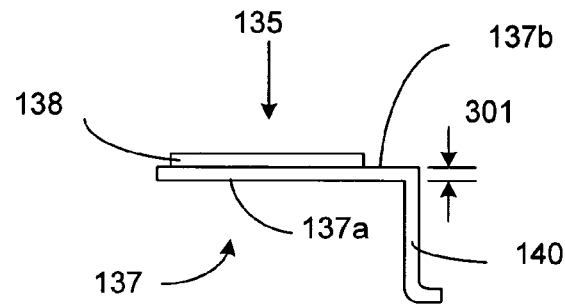
FIG. 3 is a side view of the external terminal conductor of the capacitor of FIG. 1.

Since the third section 114 of the housing is electrically conductive and is in electrical contact with the rotor 120, its exterior surface constitutes the external terminal associated the capacitor's adjustable electrode. This terminal is connectible to another circuit point on a printed circuit board to which it is mounted by an external conductor 135. Such circuit point is usually a ground connection, but may be another circuit point. Thus, commonly the external terminal conductor is a grounding lug. The lug conductor (FIGS. 3 and 4) includes a first portion 137 having an upturned collar 138 that forms a ring 137a providing an aperture to receive the capacitor housing 110, and a conductive strap portion 137b. The ring 137a surrounds and electrically connects to the exterior terminal surface of the conductive housing section 114 of the capacitor. A second portion 140 of the conductor is a continuation of the strap 137b, which forms essentially a right angle with the first section 137 to terminate at a position approximately even with the stator 130 so that it can also be soldered to another terminal on the printed circuit board.

Figure 4:
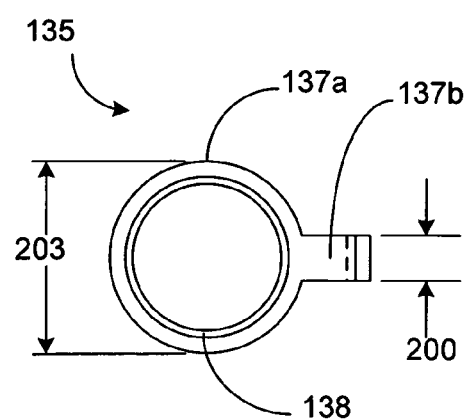
FIG. 4 is a plan view of the external grounding conductor shown in FIG. 3.

As seen from FIG. 4, the width 200 of the conductor strap 137b is much less than the diameter of the ring 137a. Moreover, the thickness of the conductor 135 (FIG. 1) is less than the thickness of the wall of the conductive housing section 114. While the presence of the collar 138 does increase the area of the electrical interface between the exterior surface of the housing section 114 and the conductor 135, current is nevertheless confined to its relatively thin transverse extent. Typical dimensions of the conductor 135 are: thickness 301 of the strap 137b=0.008 inch; strap width 200=0.04 inch, and outer diameter 203 of the ring 137a=0.140 inch. This geometry of the grounding lug is responsible for the undue increases in the non-capacitive impedance of the capacitor as power levels increase at frequencies approaching 1 GHz and above.

FIGS. 5–8 depict the improved capacitor configuration of the invention. Components that are identical to the components of the capacitor described above are given the same identifying numbers.

Specifically, and in accordance with the present invention, the electrically conductive grounding element 150 or simply "grounding element" is shaped to provide a geometry to reduce the non-capacitive impedance of the capacitor 500. To do so, Applicants have designed the subject grounding element to reduce the so-called "skin effect," which is caused by self-inductance of the conductor carrying electrical current. The self-inductance causes an increase in the inductive reactance at high frequencies and forces the electrons toward the surface of the conductor. For this reason, both the surface area of a conductor, as well as the overall cross-sectional area are important indications of how a conductor will function over a range of frequencies, and are important factors for consideration when implementing a capacitor and grounding element according to the present invention.

The dimensions of the grounding element 150 are preselected in the design phase in order to achieve desired operating characteristics at frequencies at which the capacitor is to operate. By increasing cross sectional area and surface area of the grounding element 150, electrical resistance is reduced, and thus power loss is minimized. As operational frequencies increase, the severity of the skin effect resistance also increases. Therefore, when designing a capacitor and grounding element according to the invention, one must determine to what extent an increase in material cost due to a larger grounding element 150 is acceptable, to achieve the desired performance. Naturally other considerations must also be made, such as space constraints, selection of the particular material and its specific properties, and the like.

Figure 5:
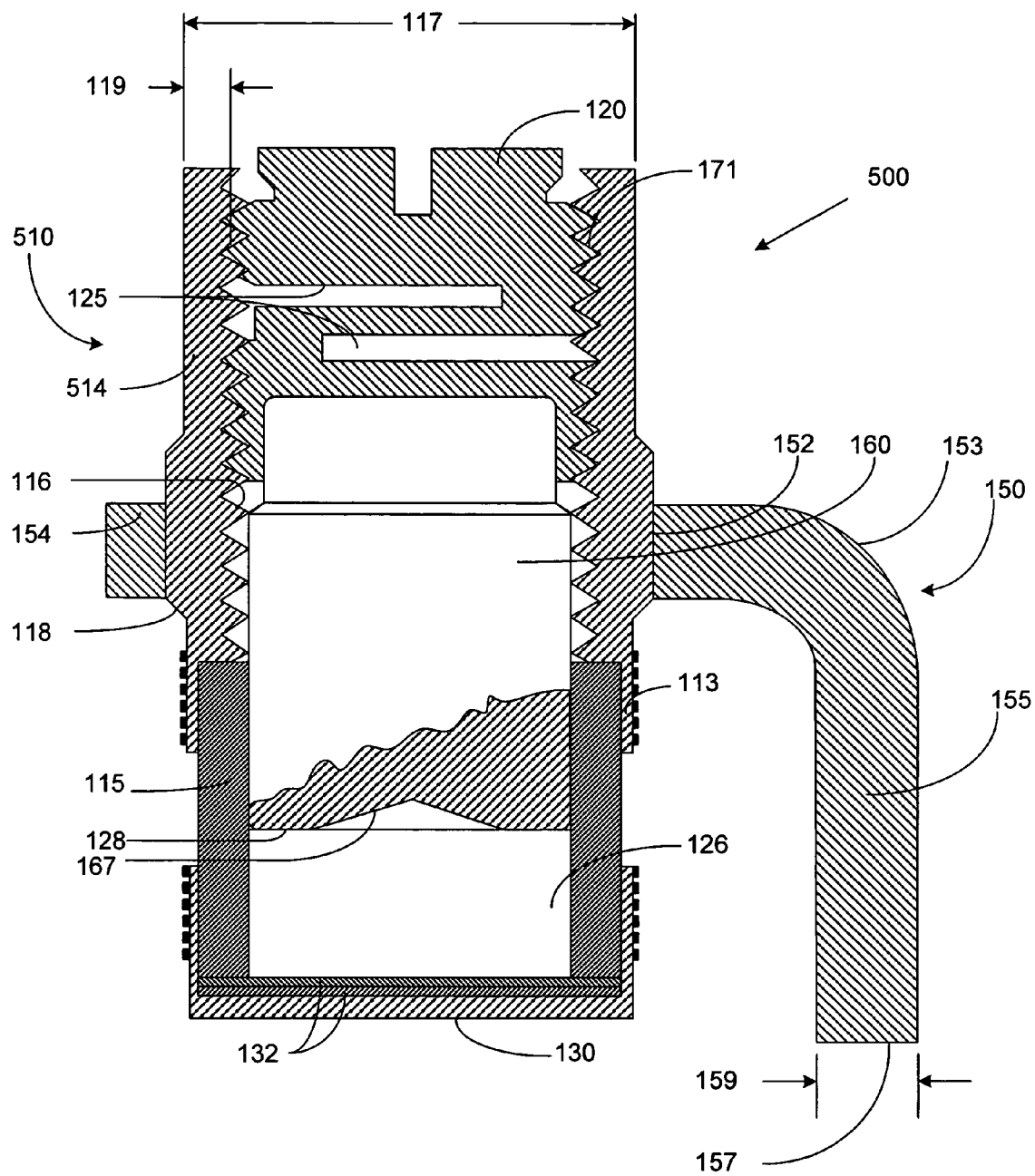
FIG. 5 is a cross-sectional representation of a barrel type capacitor in accordance the present invention.

In a preferred embodiment, the width 210 of the grounding element 150 is preselected to be greater than the width or diameter 117 of the capacitor housing 510. In the same embodiment, the thickness 159 of the grounding element 150 is preselected to be equal to or greater than an average thickness 119 of the capacitor housing or more specifically, the average thickness of the bushing (upper-portion) 514. The "average thickness" is defined as the thickness of the bushing 514, taking into consideration the thickness of the expanded diameter portion 118 and the threads 116. In calculating the average thickness, an imaginary line can be drawn between the peaks and valleys of the threads 116. In an alterative embodiment, the thickness 159 of the grounding element 150 is preselected to be equal to or greater than the thickest part of the capacitor housing 510. In the embodiment of FIG. 5, such "thickest part" of the capacitor housing 510 is the expanded diameter portion 118, and is the location at which the grounding element 150 joins the housing 510.

Depending on the specific operating characteristics desired of a particular capacitor being designed according to the invention, the dimensions of the grounding element 150 are selected accordingly. In one embodiment, the total cross-sectional area of the grounding element 150 is increased by twelve (12) times, in comparison with a grounding element of the prior art (FIGS. 1–4). This reduces "skin" inductance and "skin" resistance thereby increasing the Q value of the capacitor.

In a preferred embodiment, the thickness 159 of the grounding element 150 is 0.025 inch (compared with 0.008 inch for the prior art example shown in FIGS. 1–4). Also in this preferred embodiment, the width 210 of the grounding element 150 is 0.160 inch (compared with 0.040 inch for the prior art example shown in FIGS. 1–4). The diameter 258 (seen in FIG. 6) of this embodiment of the grounding element 150 is equal to about 0.160 inch (compared with 0.14 inch for the prior art example shown in FIGS. 1–4). Finally, the width 220 of the substantially annular portion 154 of the grounding element 150 is preferably about 0.021 inch (compared with 0.011 inch for the prior art example shown in FIGS. 1–4).

In each embodiment, the dielectric discs 130 are inserted into a cup-shaped stator 130, after which the tubular dielectric 115 is inserted. Reference numeral 126 indicates the interior surface of the dielectric tubular housing. The upper portion 514 of the housing 510 is then press fit onto the dielectric portion 115. The upper portion 514 of the housing 510 has an expanded diameter region 118, which provides increased mechanical strength for mating with the conductive grounding element 150 and which also provides a low resistance coupling at the interface between the conductive grounding element 150 and the exterior surface of the conductive housing section 114. Equally important, this expanded diameter region 118 also enables a larger surface area and larger flow of current to the grounding element 150. This is particularly important due to the manner in which current flows when the capacitor is operational. More specifically, the rotor insert 160, which is itself conductive, is in contact with the conductive rotor screw 120. The thread 171 of the rotor screw 120 engage with mating teeth 116 in the housing 510, and in-turn, electricity is transferred through the rotor screw 120 to the housing 510, through the expanded diameter portion 118 and to the conductive grounding element 150.

The grounding element 150 may be attached to the housing, or more particularly the conductive bushing 514 in a number of ways. The preferred manner of connection, however, is by press-fitting or "friction-fitting." This provides a tight connection providing good electrical conductance across the interface thereof. As an alternative to a press-fit, the grounding element 150 may be attached to the housing 510 by way of soldering, welding, or indeed, forming integrally with the housing 510 by way of casting, machining or the like. Moreover, another type of mechanical interface between the grounding element 150 and the housing 510, such as a threaded connection would be possible.

The grounding element 150 is configured so as to have an end that encircles the housing 510, and a connection strap 155 that terminates in a soldering face 157, typically for soldering to a circuit board. Between the substantially annular end 154 and the soldering face 157, is typically an approximately right angle bend 153 in order to facilitate proper orientation for soldering to the circuit board. The bottom face of the stator 130 is also typically soldered to the circuit board.

Figure 7:
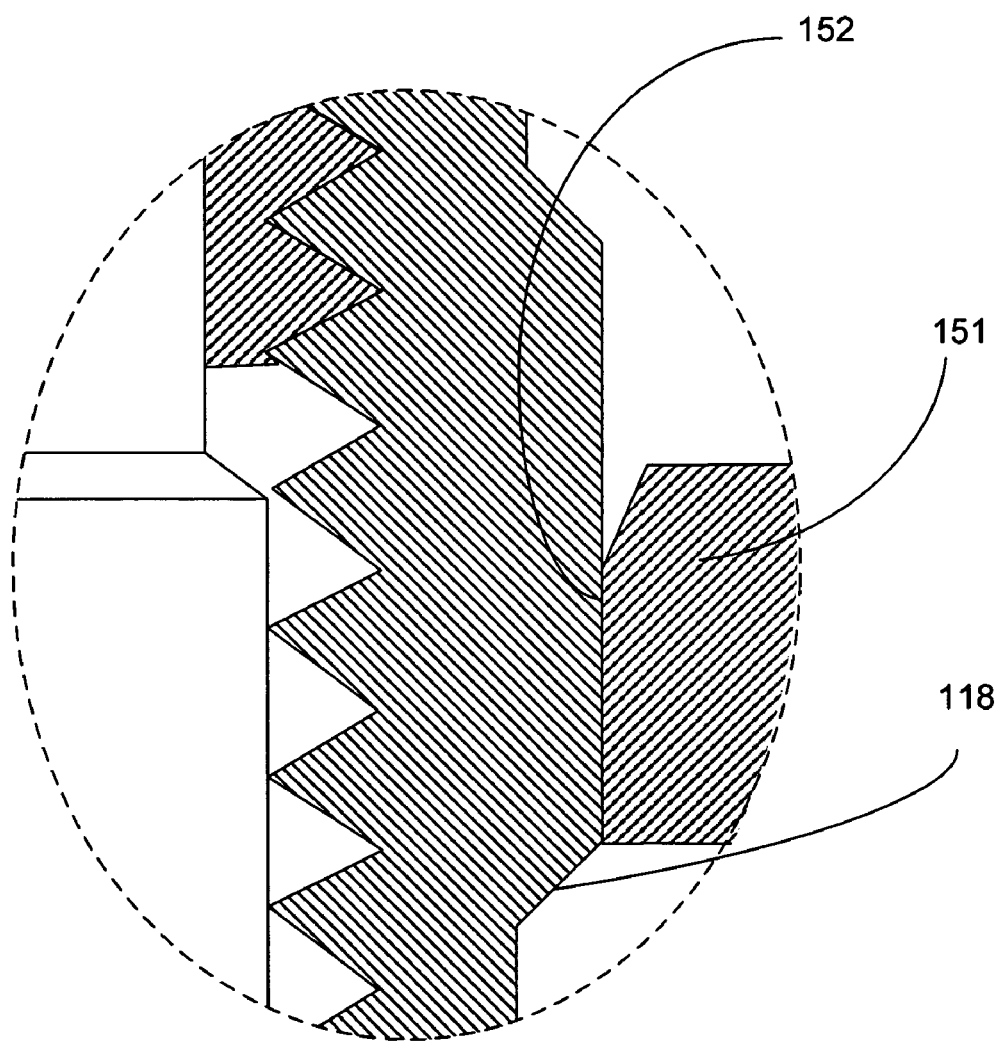
FIG. 7 is an enlarged cross-sectional view of the side terminal connection of the FIG. 5 capacitor.

FIG. 7 illustrates an enlarged view of the grounding element 150 and housing 510. The bottom surface of the grounding element 150 usually align with a point at which the bushing thickness plateaus. A slight chamfer 151 may be formed at the top edge of the conductive element 150 along the inner edge of the aperture 152. The chamfer 151 is not essential for operation of the grounding element 150, but is a by-product of drilling of the aperture 152. Naturally, the chamfer 151 may reside on the bottom side of the grounding element 150. While not functional in the operation of the capacitor 500, the chamfer 151 can facilitate insertion of the bushing 111 into the aperture 152 during the press-fitting operation.

Figure 6:
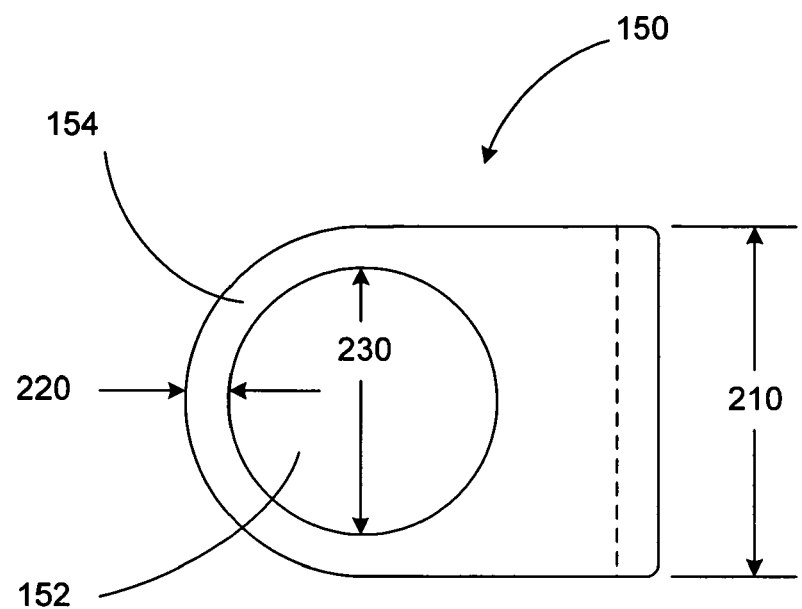
FIG. 6 is a plan view of the external terminal conductor of the capacitor of FIG. 5.
Figure 8:
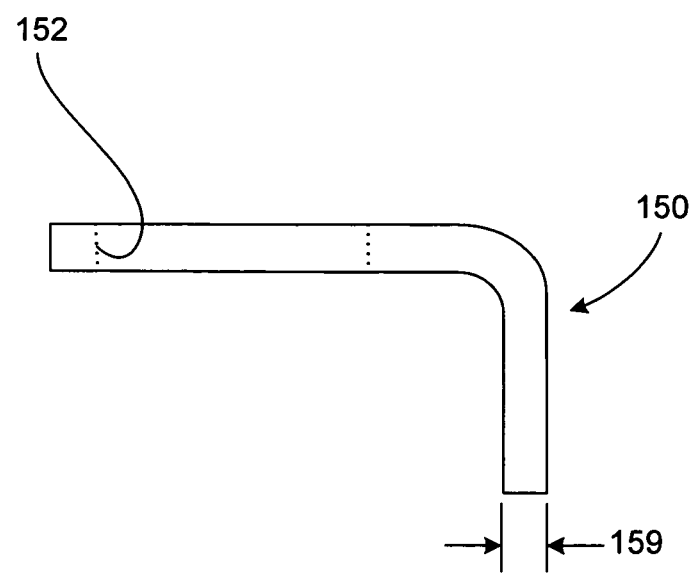
FIG. 8 is a side view of the grounding terminal conductor of the capacitor of FIG. 5.

FIG. 6 illustrates the subject grounding element 150. The diameter 230 of the aperture 152, which substantially corresponds to the external diameter of the expanded diameter section 118 of the housing 510, is seen. The width of the substantially annular end 154 of the grounding element 150 is sufficiently wide and to have a sufficient surface area so that the skin effect is also reduced in this part of the grounding element 150, as compared with the prior art. Accordingly, the width 220 of the substantially annular portion 154 is preferably equal to about the thickness 119 of the bushing 111. Thus, the width of the grounding element 220 can be designed to be greater than or substantially equal to sum of the width 117 of the cylindrical housing, or bushing 110 and two times the average thickness of the housing 119. Similarly, defining the width 220 of the annular portion 154 of the grounding element 150 and the thickness 159 of the grounding element 150 to both be equal to or greater than the average thickness 119 of the conductive portion 514 of the housing 510, results in an annular portion 154 having a cross-sectional area equal to or greater than the average thickness 119 of the housing 510 to the second power (that is, "squared").

Figure 9:
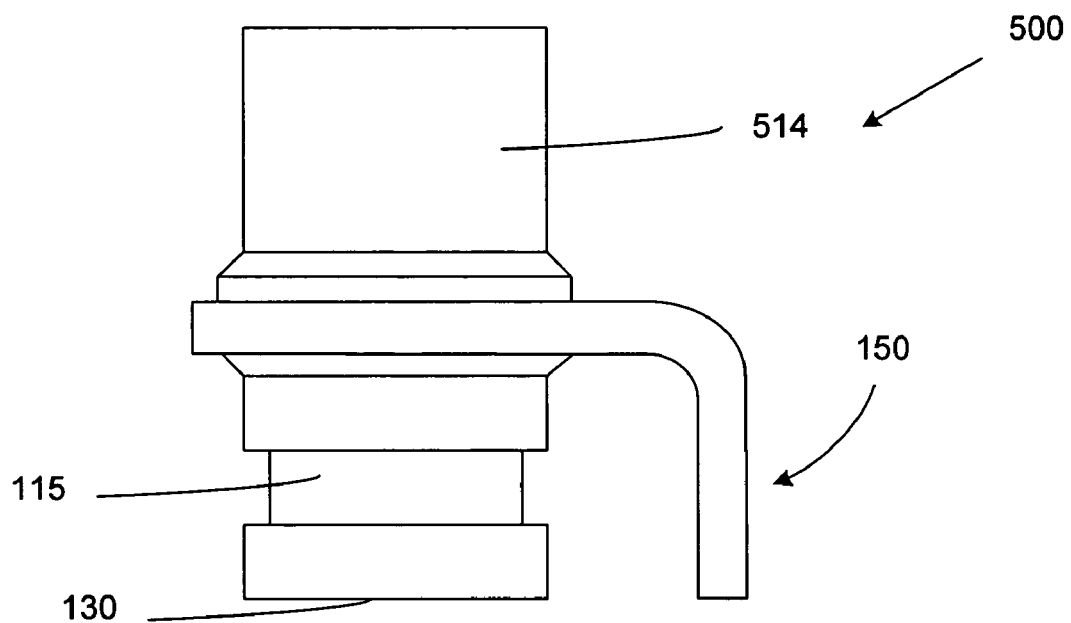
FIG. 9 is a side view of the barrel type capacitor in accordance the present invention, for which a cross-section is shown in FIG. 5.
Figure 10:
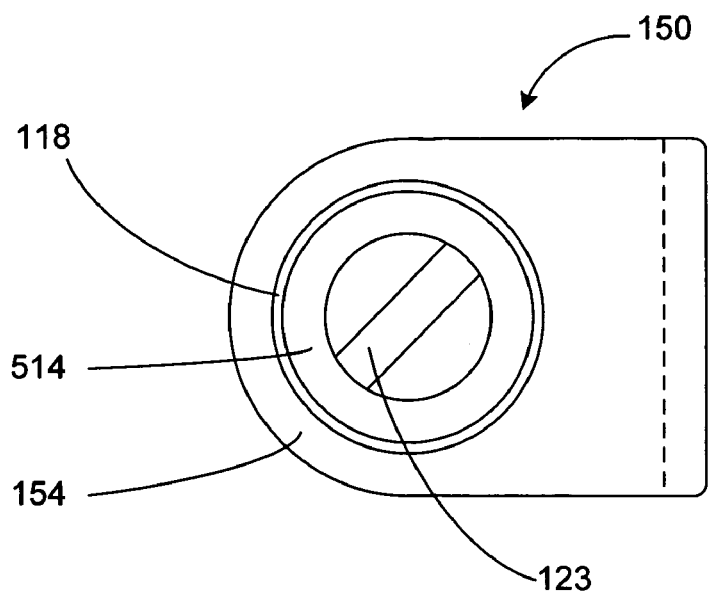
FIG. 10 is a top view of the barrel type capacitor of FIG. 9.
Figure 11:
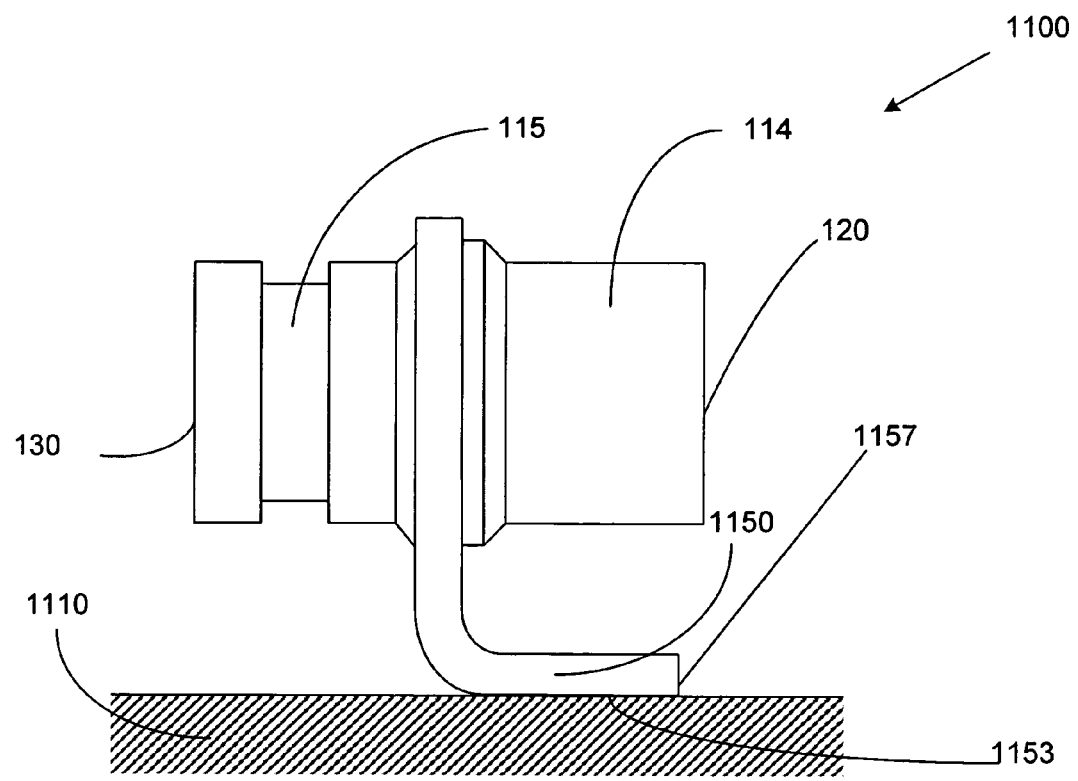
FIG. 11 is a side view of a barrel type capacitor in accordance the present invention, illustrating an alternative configuration of the grounding element in relation to the capacitor.

FIG. 11 illustrates the capacitor 500 of FIG. 5, for which the grounding element 150 has been configured in a different orientation, relative to the capacitor housing 110. In this embodiment, the capacitor 1100 includes a grounding element 1150 that is oriented toward the bushing 514, rather than toward the stator 130. Furthermore, the capacitor 1100 is mounted on a substrate 1110 by a large, flat face 1153 of the connection strap 155. This mounting configuration takes advantage of the increased mechanical strength of the grounding element 1150, as compared with those of the prior art, which are thinner and much less rigid. Naturally, the grounding element could be arranged, relative to the housing 510 of the capacitor as shown in FIG. 9, and still be mounted on its side. In either case, the stator 130 can be connected to other circuit points by way of a separate electrical conductor, such as a resonator. This arrangement saves space on the circuit board by elevating the majority of the capacitor off of the circuit board, thereby allowing access to the circuit board and circuit components below the capacitor. Other alternative support arrangements are also possible. The short end of the grounding element 1157 may be connected to the circuit board and also support the capacitor off of the circuit board. In such an embodiment, it is even more necessary that any junction between the grounding element and the circuit board be strengthened as much as possible.

In some embodiments, it may be desirable to manufacture the grounding element 150 (and 1150) integrally with the housing 510 of the capacitor 500. The increased diameter portion 118 of the bushing 514 distinguishes the capacitor housing 110 of the present invention from that of the prior art. However, this increased diameter portion 118 can be seamlessly transition into the grounding element 150. In such an embodiment, the integral component, having the bushing 514, increased diameter portion 118 and the grounding element 150 can be machined as one piece. Such a component can also be cast.

In some embodiments, the grounding element 150 (and 1150) can function as a heat sink to help dissipate heat. As such, the grounding element 150 can be lengthened in order to provide more surface area from which to dissipate heat energy.

Further, the grounding element 150 can be utilized in conjunction with circuit components other than barrel-type capacitors. The grounding element 150 can be used in conjunction with, or indeed, manufactured integrally with, for example, any leaded capacitor, resistor or inductor. The grounding element will provide operational benefits at high frequencies for these components, similarly to capacitors.

Materials used for the grounding element 150 may be any suitable conductive material, such steel, stainless steel, brass, aluminum, copper, gold, silver or platinum, or other metals or alloys. The grounding element 150 may have an underlying structure formed of one metal (or even a non-conductive material) with a surface layer or plating layer of one of the aforementioned metals. Preferably, the grounding element 150 is manufactured from brass or invar and is plated on its surface by gold, silver or chromate. Brass and invar may also be used to construct other elements of the capacitor, and sapphire or other mechanically strong dielectric material is preferably used. Use of a strong dielectric allows for the particular structure illustrated, in which mechanical strength of the grounding element 150 is not essential to provide support for the bushing 514. For all of the foregoing, use of materials other than those described, is possible.

While the above example capacitor is a barrel-type having a substantially cylindrical shape, it is to be understood that the invention is applicable to other types of capacitors, and/or those having different overall shapes.

Applicant has performed a comparative analysis between a capacitor and grounding element according to the invention, and a capacitor and grounding element according to the prior art (FIGS. 1–4). The results are set forth below in Table 1.

rienced by the capacitor according to the present invention, over that according to the prior art. Applicant's test inductive transmission line was limited to frequencies below about 3600 MHz, thus data for the test, displayed in the last column (including negative values) for frequencies of about 3500 MHZ are due to the limitations of the test setup. Applicant believes that the trend of improved Q values would continue were test line frequency limitations not present.

Additionally, capacitance is more constant, throughout the range of frequencies, in the capacitor according to the present invention than it is in the capacitor according to the prior art. With the prior art capacitor, capacitance gradually increases to a maximum at about 3120 MHz of about 15 times its original value at about 460 MHz. Over the same range of frequencies, the present capacitor experiences an increase of only about 3.8 times. This is also due to a decrease in the parasitic effect of self-inductance experienced by the capacitor according to the present invention, over that according to the prior art.

Preferably, the methods and apparatuses of the present invention, as described above and shown in the drawings, provide for a capacitor capable of handling operational frequencies between 5 and 10 GHz and above.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. An adjustable capacitor comprising:
    a tubular housing including a first insulating section and a second section having a conductive portion at the exterior surface thereof forming an external terminal;

TABLE 1

| | | Wavelength | | | | | | | |
|---|---|---|---|---|---|---|---|---|---|
| | | 1/4 λ | 3/4 λ | 5/4 λ | 7/4 λ | 9/4 λ | 11/4 λ | 13/4 λ | 15/4 λ |
| Prior Art Capacitor and Grounding element | Freq. (MHz) | 463.672 | 925.782 | 1384.776 | 1838.662 | 2282.891 | 2711.276 | 3124.166 | 3521.436 |
| | ESR (Ohm) | 0.209 | 0.155 | 0.357 | 0.280 | 0.490 | 0.552 | 1.172 | 2.980 |
| | $C_{eq}$ (pF) | 0.732 | 0.781 | 0.870 | 1.022 | 1.336 | 2.218 | 11.027 | −2.192 |
| | $Q_{cap}$ | 2242.60 | 1416.35 | 370.05 | 302.32 | 106.58 | 47.92 | 3.94 | −6.92 |
| Capacitor According to Present Invention | Frequency (MHz) | 464.100 | 927.009 | 1387.699 | 1845.159 | 2296.766 | 2738.840 | 3168.642 | 3582.946 |
| | ESR (Ohm) | 0.201 | 0.110 | 0.442 | 0.329 | 0.466 | 0.562 | 0.954 | 3.768 |
| | $C_{eq}$ (pF) | 0.710 | 0.748 | 0.814 | 0.915 | 1.100 | 1.494 | 2.681 | −38.621 |
| | $Q_{cap}$ | 2407.89 | 2086.70 | 318.83 | 286.71 | 135.22 | 69.25 | 19.63 | −0.31 |

In order to measure Q and ESR (Equivalent Series Resistance) of each capacitor, the samples were resonated with an inductive transmission line. A network analyzer was used to capture data to calculate Q, ESR, and capacitance, which are tabulated above over a range of test frequencies. The present capacitor is preferably used at relatively high frequencies. It can be seen from the above tabulated test results that between frequencies of about 2200 MHz and 3200 MHz, the capacitor according to the present invention experiences a higher Q value than that of the prior art. At the same time, the Q value of the prior art capacitor deteriorates relatively rapidly, as compared with the capacitor and grounding element according to the present invention. This effect is due to a decrease in the parasitic effect of self-inductance expea fixed first electrode adjacent the insulating section of the housing connectible to an external circuit;

a second electrode element received within the housing and being movable in the direction of the axis of the housing to alter the spacing between the first and second electrodes to thereby alter the capacitance of the capacitor, the second electrode being in electrical contact with the conductive portion of the second section of the housing; and an external terminal conductor joined to the exterior terminal portion of the second housing section, for connecting the terminal to an external circuit, the conductor having a thickness, not less than a thickness of the conductive portion over its length between the interface and the external circuit.

2. The adjustable capacitor of claim 1, wherein a thickness of a wall of the second housing section is thicker at the interface with the external terminal conductor than an average thickness of the wall of the second housing section.

3. The adjustable capacitor of claim 1, wherein the thickness of the conductive portion is an average thickness of the conductive portion.

4. The adjustable capacitor of claim 1, wherein the thickness of the conductive portion is a greatest thickness of the conductive portion.

5. The adjustable capacitor of claim 1, wherein the thickness of the conductive portion is a thickness of the conductive portion at the interface between the conductive portion and the external terminal conductor.

6. The adjustable capacitor of claim 1, wherein a width of the external terminal conductor is not appreciably less than a transverse dimension of the housing, throughout the length of the external terminal conductor.

7. The adjustable capacitor of claim 1, wherein the external terminal conductor includes a ring-shaped portion substantially surrounding the exterior terminal portion of the second housing section.

8. The adjustable capacitor of claim 7, wherein a width of the external terminal conductor is not appreciably less than a transverse dimension of the ring-shaped portion, throughout the length of the external terminal conductor.

9. The adjustable capacitor of claim 7, wherein the ring-shaped portion has a thickness not less than a thickness of the housing.

10. The adjustable capacitor of claim 1, wherein the external terminal conductor is formed integrally with the tubular housing.

11. The capacitor of claim 1, wherein the conductor is joined to the housing by a high friction press-fit.

12. The capacitor of claim 1, wherein the grounding element includes a substantially right-angle bend between a first portion contacting the housing and a second portion for connection to an external electrical circuit.

13. The capacitor of claim 1, wherein the width of the housing is about 0.118 inch and the width of the grounding element is about 0.16 inch.

14. The capacitor of claim 1, wherein the thickness of the grounding element is about 0.025 inch.

15. The capacitor of claim 1, wherein the width of the conductor is about 0.160 inch.

16. A method of manufacturing a capacitor for use in high frequency alternating current circuits, the method comprising:

providing a tubular housing including a first insulating section and a second section having a conductive portion at the exterior surface thereof forming an external terminal;

providing a fixed first electrode adjacent the insulating section of the housing connectible to an external circuit;

providing a second electrode element received within the housing and being movable in the direction of the axis of the housing to alter the spacing between the first and second electrodes to thereby alter the capacitance of the capacitor, the second electrode being in electrical contact with the conductive portion of the second section of the housing; and joining an external terminal conductor to the exterior terminal portion of the second housing section, for connecting the terminal to an external circuit, the conductor having a thickness, not less than a thickness of the conductive portion over its length between the interface and the external circuit.

17. A capacitor comprising:

a housing having a substantially predetermined width, walls of the housing having a substantially predetermined average thickness, the housing also having at least one electrically insulating portion;

a stator, acting as a first electrode, arranged in a first conductive portion of the housing;

a rotor, acting as a second electrode threadedly engaged with a second conductive portion of the housing, such that rotation of the rotor adjusts a linear distance between a face of the rotor and the stator, the at least one electrically insulating portion of the housing insulating the first and second electrically conductive portions of the housing;

a dielectric interposed between the stator and the rotor; and a conductive grounding element configured to electrically connect the second electrically conductive portion of the housing of the capacitor to an external electrical source, the grounding element having a width greater than the width of the housing, and a thickness greater than or equal to the average thickness of the housing.

18. The capacitor of claim 17, wherein the width of the grounding element is greater than or substantially equal to sum of the width of the cylindrical housing and two times the average thickness of the housing.

19. The capacitor of claim 17, wherein the housing is substantially cylindrical in shape.

20. The capacitor of claim 17, wherein the grounding element is press-fitted onto the housing to form a secure electrical connection.

* * * * *

UNITED STATES PATENT AND TRADEMARK OFFICE
CERTIFICATE OF CORRECTION

| | |
|---|---|
| PATENT NO. | : 7,190,565 B1 |
| APPLICATION NO. | : 11/118459 |
| DATED | : March 13, 2007 |
| INVENTOR(S) | : Marantz |

It is certified that error appears in the above-identified patent and that said Letters Patent is hereby corrected as shown below:

Col. 1, line 22, please replace "further" with --farther--.

Signed and Sealed this

Tenth Day of July, 2007

JON W. DUDAS
*Director of the United States Patent and Trademark Office*